Sept. 7, 1948.　　　　G. W. HARDER　　　　2,448,591
BOAT LOADING DEVICE

Filed Dec. 17, 1946　　　　　　　　　　2 Sheets—Sheet 1

Inventor
George W. Harder

By *Clarence A. O'Brien*
and *Harvey B. Jacobson*
Attorneys

Sept. 7, 1948.　　　　　G. W. HARDER　　　　　2,448,591
BOAT LOADING DEVICE
Filed Dec. 17, 1946　　　　　　　　　　　　2 Sheets-Sheet 2

*Inventor*
George W. Harder

By *[signatures]*
*Attorneys*

Patented Sept. 7, 1948

2,448,591

UNITED STATES PATENT OFFICE 2,448,591

BOAT LOADING DEVICE

George W. Harder, Louisville, Ky.

Application December 17, 1946, Serial No. 716,739

4 Claims. (Cl. 214—77)

The present invention relates to new and useful improvements in boat loading devices and more particularly to a device of this character for loading a boat onto and unloading the boat from the top of an automobile or other vehicle.

An important object of the present invention is to provide a boat loading device of this character by means of which a person may load a boat onto the top of an automobile or unload the boat therefrom with comparatively little effort and without danger of marring or damaging either the boat or the vehicle.

A still further object of this invention is to provide a boat loading device by means of which a boat may be raised into position for carrying the boat on top of an automobile and for removing the boat therefrom with a minimum amount of time and effort.

A still further object is to provide front and rear boat supporting arms pivotally attached to the front and rear bumper of an automobile and which may be easily removed from the vehicle, when desired.

A still further object is to provide a device of this character of simple and practical construction, which is strong and durable, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
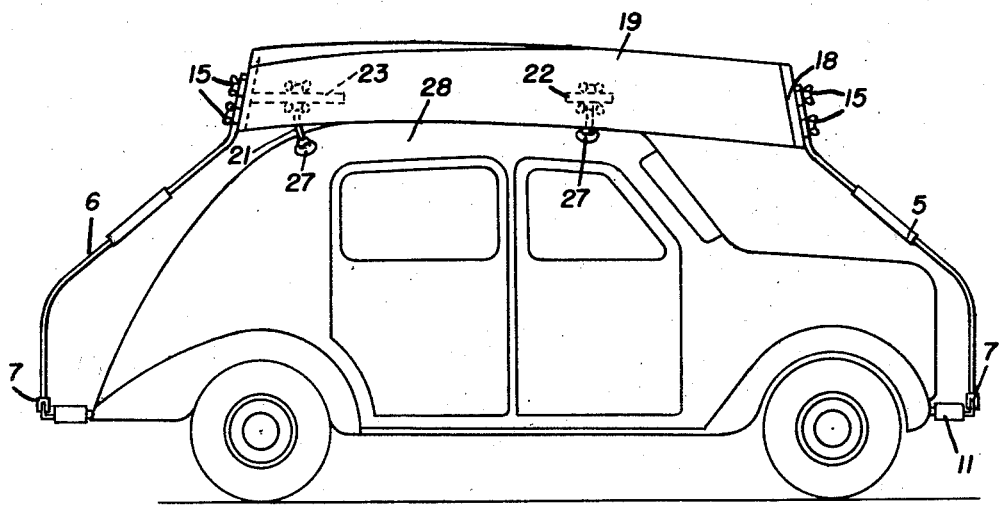
Figure 1 is a side elevational view.

Referring now to the drawings in detail wherein for the purpose of illustration I have disclosed a preferred embodiment of the invention, the numerals 5 and 6 designate the front and rear supporting arms constructed of suitable material, such as tubing or the like, the lower end of each arm being provided with an inverted U-shaped clevis 7 through which a bolt and nut 8 is inserted for pivotally connecting to the upturned end 9 of a clamping bracket 10 which is secured to a vehicle bumper 11.

Figure 2:
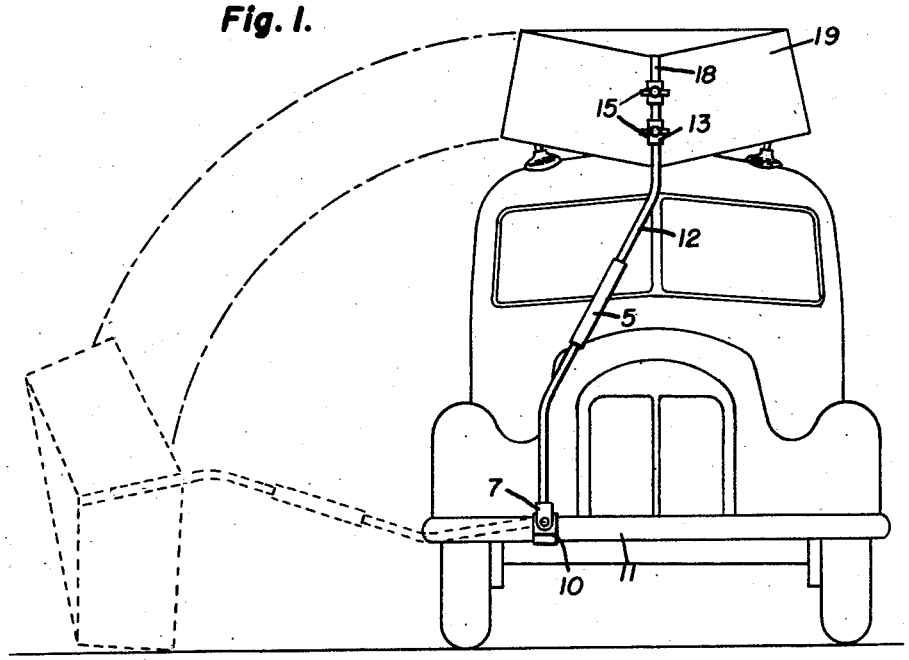
Figure 2 is a front elevational view.
Figure 3:
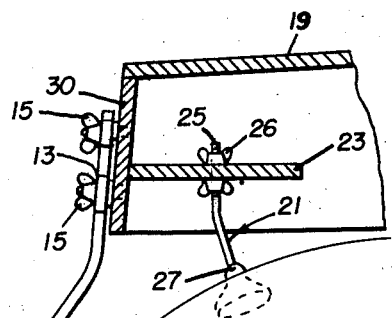
Figure 3 is an enlarged side elevational view of one of the boat supporting arms and with the vehicle bumper and boat shown in section.
Figures 4, 6:
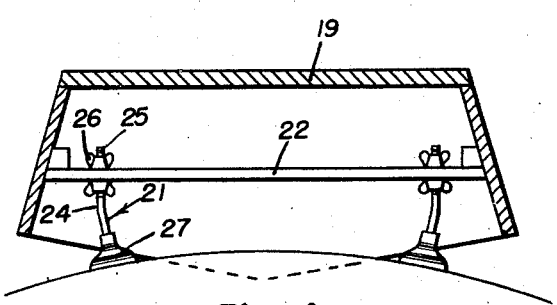
Figure 4 is a transverse sectional view of the boat showing the suction cup provided for supporting the boat on top of the vehicle.
Figure 6 is a group side elevational view of one of the clamping bolts and waterproof bushings for securing the upper end of the supporting arms to the boat.
Figure 5:
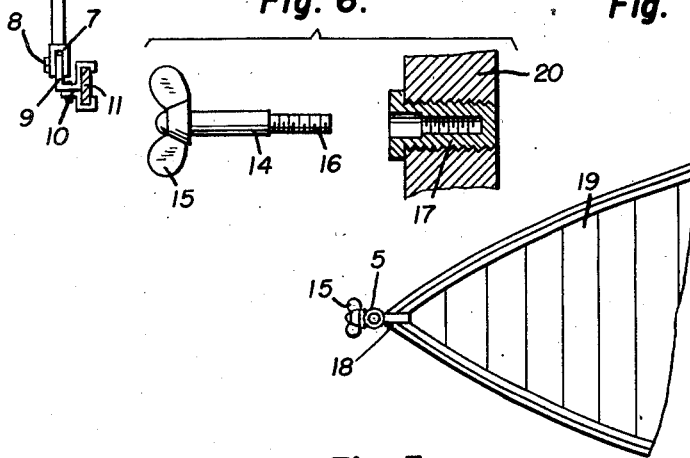
Figure 5 is a fragmentary top plan view of the front end of the boat showing the supporting arm attached thereto.

The lower end of each arm is secured to one of the bumpers adjacent one end of the latter as shown in Figure 2 of the drawings and the upper end of the arms are offset toward the longitudinal center of the vehicle as shown at 12.

The upper ends of the arms are provided with reinforcing collars or sleeves 13 through which shouldered bolts 14 are inserted, the outer ends of the bolts being provided with wing nuts 15 and the inner ends of the bolts being threaded as shown at 16 for threading into a water-proof bushing 17 closed at its inner end and externally threaded. A pair of the bushings 17 are threaded into the bow 18 of a boat 19 and a pair of the bushings are also threaded into the stern or transom 20 of the boat for attaching the upper ends of the front and rear arms 5 and 6 respectively thereto.

Supporting legs 21 are secured to the front and rear seats 22 and 23 respectively of the boat adjacent the sides thereof, each of the legs including a rod 24 threaded at one end as shown at 25 and extended through the seat with wing nuts 26 threaded thereon above and below the seat to secure the leg in adjusted position thereon. To the other end of the rod 24 is secured a rubber suction cup 27.

The legs 21 extend upwardly from the seats of the boat so that the suction cups 27 will rest on the top 28 of an automobile when the boat 19 is placed in inverted position thereon.

In the operation of the device, with the front and rear arms 5 and 6 connected to the front and rear bumpers of the vehicle and with the upper ends of the arms secured to the bow and stern respectively of the boat 19, the boat may be swung from its lower position on the ground as shown by the dotted lines in Figure 2 of the drawings into its raised position on top of the automobile as shown by the full lines in Figure 2 and the legs 21 and rubber suction cups 27 will support the boat in a balanced position on the top 28 of the automobile.

By offsetting the arms 5 and 6, the initial downward swinging movement of the boat in unloading the same from the automobile will cause a slight raising movement of the boat to lift the suction cup 27 from the top and thus prevent scraping of the suction cup on the top of the car.

The legs 21 may be adjusted vertically and secured by the wing nuts 26 to raise or lower the suction cup relative to the top of the car.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A loading device for vehicles comprising a pair of angular arms pivoted at their lower ends respectively to the front and rear of a vehicle for vertical swinging movement, said arms having their lower ends pivoted adjacent one side of the vehicle and their upper ends offset and raised toward the center of the vehicle to cause an initial raising movement of the article above the top of the vehicle upon a downward swinging of the arms at said one side of the vehicle, vertically adjustable legs carried by the article for engaging the vehicle.

2. A loading device for vehicles comprising a pair of angular arms pivoted at their lower ends respectively to the front and rear of a vehicle for vertical swinging movement, means carried by the upper ends of the arms for attaching to an article to be lifted by the arms into and out of position on top of the vehicle, vertically adjustable legs attached to the article, and suction cups at the lower ends of the legs for resting on the top of the vehicle.

3. A loading device for use with vehicles having front and rear bumper means comprising an angular support arm pivoted at one end to the front bumper and a similar arm pivoted to the rear bumper, said arms being offset and converging medially of the vehicle, angular attaching terminals on said arms, article attaching means comprising an internally threaded socket recessed in an article, an attaching element carried by the attaching terminals and threaded into the socket, friction means for supporting an article on the vehicle and means for adjustably securing said friction means to an article.

4. A loading device for use with vehicles having front and rear bumper means comprising a pair of angular support arms pivoted at one end to the front and rear bumper for vertical swinging movement, said arms being inwardly directed relative to each other and extending upwardly from their attached ends, an article secured to said arms, an internally threaded socket in the article, an attaching bolt carried by the arm and threaded into the socket, vertically adjustable legs attached to the article, and suction cups at the lower ends of the legs for resting on the top of the vehicle.

GEORGE W. HARDER.

REFERENCES CITED

The following references are of record in the file of this patent:

UNITED STATES PATENTS

| Number | Name | Date |
| --- | --- | --- |
| 1,681,936 | Hillstrom | Aug. 28, 1928 |
| 2,180,032 | Casley | Nov. 14, 1939 |
| 2,294,864 | Palmer | Sept. 1, 1942 |
| 2,325,762 | Ford | Aug. 3, 1943 |
| 2,392,008 | Squires | Jan. 1, 1946 |
| 2,395,173 | Dobler | Feb. 19, 1946 |